United States Patent [19]
Issa et al.

[11] Patent Number: 5,532,670
[45] Date of Patent: Jul. 2, 1996

[54] METHOD OF INDICATING THE THREAT LEVEL OF AN INCOMING SHOCK TO AN ELECTRONICALLY SECURED VEHICLE AND APPARATUS THEREFORE

[75] Inventors: Darrell E. Issa, Vista; Jerry W. Birchfield, Escondido, both of Calif.

[73] Assignee: Directed Electronics, Inc., Vista, Calif.

[21] Appl. No.: 112,940

[22] Filed: Aug. 30, 1993

Related U.S. Application Data

[63] Continuation-in-part of Ser. No. 886,871, May 22, 1992, abandoned, and a continuation-in-part of Ser. No. 945,667, Sep. 16, 1992.

[51] Int. Cl.[6] ............................................. G08B 13/02
[52] U.S. Cl. ................................ 340/429; 340/566
[58] Field of Search ..................................... 340/429, 566

[56] References Cited

U.S. PATENT DOCUMENTS

4,584,569  4/1986  Lopez et al. ......................... 340/429
4,866,417  9/1989  DeFino et al. ....................... 340/429
5,084,697  1/1992  Hwang .................................. 340/566

Primary Examiner—Glen Swann
Attorney, Agent, or Firm—Sam Talpalatsky

[57] ABSTRACT

A method of indicating the threat level of an incoming shock to an electronically secured vehicle and eliminating spurious signals developed from the interaction of EMF and RF energy fields with the shock sensor including the steps of sensing a shock delivered to the vehicle indicative of an attempted intrusion, generating an electric signal the strength of which is proportional to the intensity of the shock, analyzing the signal to determine if it is of a low, generally non-threatening intensity or a higher, generally security-threatening intensity, ignoring the first 5 milliseconds of the signal produced by the shock sensor, ignoring all signals that do not disappear and later reappear, and producing either a first pulse representing a low intensity signal, or separate first and second pulses representing a signal containing both low intensity and higher intensity components.

40 Claims, 6 Drawing Sheets

METHOD OF INDICATING THE THREAT LEVEL OF AN INCOMING SHOCK TO AN ELECTRONICALLY SECURED VEHICLE AND APPARATUS THEREFORE

RELATION TO OTHER PATENT APPLICATIONS

This patent application is a continuation-in-part (CIP) of patent application Ser. No. 07/886,871, filed May 22, 1992, now abandoned and a continuation-in-part (CIP) of patent application Ser. No. 07/945,667, filed Sep. 16, 1992.

BACKGROUND OF THE INVENTION

1. Field of the Invention

This invention pertains to the field of electronic security systems that detect unwanted intrusions into secured areas and sound an audible alarm in response thereto. More particularly, the invention pertains to a method of differentiating between a high intensity shock or substantial threat as well as a low intensity or insubstantial threat, received by the protected structure, and sounding an appropriate alarm as well as preventing non-shock energy inputs from tripping the security alarm.

2. Description of the Prior Art

Electronic security systems have been used for some years and their popularity increases as the national crime rate continues to climb. Most such systems, especially those used in structures such as automobiles, include a controller, a series of intrusion sensors such as triggers for detecting attempted intrusions through doors, hood, and windows, an alarm for activation upon receipt of a signal or signals from the sensors indicating an attempted unwanted entry into the vehicle, and a power source, normally the vehicle battery, to power the system and sound the alarm. Other components are often included such as automatic resetting circuits and shut-down devices for use when the alarm needs to be deactivated. These systems may be original equipment on new vehicles or retro-fitted on existing vehicles.

The security systems may be activated and deactivated by an RF signal, usually a digitally coded signal specific to the particular vehicle, that is sent by a hand-held transmitter operated by one or more push buttons activated by the car owner. In addition, other such systems may be activated by mere passage of time following the driver's act of turning off the motor and exiting the vehicle with the doors and windows closed and after a short time interval such as 30 seconds. Thereafter the system may be deactivated by a hand-held transmitter or by a delay circuit that activates the alarm if the system is not deactivated by the driver upon entry into the vehicle. The first type of activation is known as "active arming" while the latter is known as "passive arming".

Upon detection of an attempted intrusion into the vehicle, from either an input from a trigger or a sensor, the alarm is activated for a period of time, for instances 45 seconds to one minute, and then, if the alarm has not been deactivated by the remote transmitter or by the manipulation of a "kill" switch mounted in the interior of the vehicle, usually in a hidden area therein, the alarm is deactivated and the security system is once again reset to monitor the sensors and triggers.

One form of such a sensor is called a "shock" sensor and could comprise a permanent magnet suspended in an elastic mount such as between one or more rubber bands adjacent to an induction coil wired into an electronic security circuit interior to the vehicle. An incoming mechanical shock to the vehicle, such as an impact from another automobile, or a person lightly opening a car door against the vehicle, or a person tapping the car window with a coin, causes the magnet to vibrate in the rubber bands causing the magnetic field surrounding the magnet to interact with the induction coil and induce an alternating electric voltage in the coil. The voltage passes from the coil to an amplifier and if it exceeds a base reference value impressed on the amplifier circuit, is passed on through to the alarm whereupon the alarm is activated.

Certain problems exist with these security systems that render their usage less than desirable under certain circumstances. For instance, a shopping cart inadvertently lightly bumped against the vehicle will usually cause the full alarm to go off. While the alarm is certainly necessary to alert the owner, inadvertent tripping of the alarm is annoying and could result in either the owner becoming frustrated and thereafter not activating the alarm in a crowded parking lot or convincing the shopper or other car owner that such a loud, annoying alarm is not what he or she wants in their particular car.

In other situations, certain transient electric fields can generate enough of a signal in the induction coil to trip the alarm even in the absence of a physical touching of the vehicle. In the case where the owner turns on the headlights for night driving, the surge of direct current to the headlights and running lights can generate such an EMF pulse that its interaction with the sensor induction coil will generate a strong enough signal to be picked up by the induction coil, amplified and trip the alarm. Other situations, such as where the owner uses a cellular telephone in the vehicle, the initial surge of RF energy from the cellular telephone in the vehicle to link up with the telephone circuit is often sufficient to generate an actuation level signal. Still further, in isolated cases, such as where a police car parks behind a motorist and the officer "keys" the microphone on his radio, the RF surge from his transmitter could interact with the anti-theft system induction coil and produce a false alarm.

Still further, there are instances where a disturbance continues unabated after the initial activation of the alarm sequence. For instance, a vehicle parked next to a train station may receive an input as a train passes. The alarm will commence and terminate yet the train has not passed completely by the vehicle. In the prior art, the alarm will sound again because of the continuous input of energy from the train. This can be of annoyance to others in the area.

Crowded parking lots are prime areas for car theft. In these cases, dissatisfaction with the anti-theft system may cause the owner to cease arming the system thus leaning the vehicle unprotected. This condition, if not corrected, may cause other vehicle owners to cease purchasing any such security system for fear of annoying others.

What is needed to deal with these circumstances is (1) a vehicle security sensor that will differentiate between the strength of a light, generally non-threatening shock and a stronger, usually security-threatening shock to the vehicle and output a pulse to the alarm circuit appropriate to the strength of the incoming shock; and, (2) a vehicle security system that will look for these unwanted non-physical threatening shocks and block them or otherwise divert the signals they produce so that an alarm is not generated.

SUMMARY OF THE INVENTION

This invention is a novel method of dealing with these problems and differentiating between mild and severe shocks delivered to the vehicle, using a single shock sensor of the type previously described. An alarm is produced that is proportionate to these shocks. The low intensity alarm is called a "warn-away" and is of a serious but far quieter nature and will generally get the proper message to the individual without engaging the full alarm. The person inducing the shock is quietly but firmly advised by prerecorded voice or a series of soft chirps of the limited intrusion while the vehicle owner is not required to attend the vehicle to shut off the alarm.

In addition, this invention includes the novel feature of providing full wave rectification of the output from the shock sensor and clipping or ignoring the first few milliseconds of the signal produced and further requires the signal to drop to its zero or reference voltage before triggering any warning alarm. Therefore, only physical assaults on the vehicle, as compared with "electrical" assaults, are allowed to proceed through the system to be subsequently analyzed and compared. These features therefore eliminate the spurious signals that are produced by non-physical assaults.

Most security systems involve only half-wave rectification of the induced signal emanating from the induction coil. Shocks to the protected vehicle may cause the detector, such as a magnet positioned adjacent the induction coil, to first swing away from the coil before swinging back toward the coil in periodic motion. In that situation, should the rectification include only the first swing away from the coil, the signal thereby generated would be of unnaturally low value and not be an accurate reproduction of the full intensity of the shock. Full wave rectification of the induced signal nullifies this anomaly and provides a signal representing a more accurate assessment of the shock. Therefore, the output from the magnet-induction coil is made more accurate and not so dependent upon whether the coil first moves toward the induction coil or away from it; a signal of similar strength is produced notwithstanding whether the magnet is first caused to approach the coil or recede from it.

The method and apparatus disclosed herein analyzes the signal produced by the changing magnetic field from the vibrating magnet and, in the case of a mild or low intensity shock, generates a pulse that may be used to activate a warn-away alarm that will automatically reset itself without intervention by the vehicle owner. The same method and apparatus will generate both the mild shock responsive pulse as well as a stronger second pulse when it is determined that the shock exceeds a specific energy level. Both the non-threatening and the threatening levels of incoming shock are constantly monitored by the apparatus.

When the non-threatening "warn-away" pulse is generated the threatening pulse generator is still in a monitoring mode and can be activated by a threatening level shock incoming to the vehicle even while a warn-away message is being given. If two or more mild shocks are received by the vehicle within a finite time period, such as 7 seconds, the system will produce a full alarm whereas if the mild shocks are repeated on a sequence longer in time than 7 seconds, a second and repeated "warn-away" alarm will be produced again.

The prior art has not yet appreciated these features and would continue to generate repeated "warn-away" alarms. In fact, in some cases the energy dispensed in the "warn-away" alarm is of sufficient magnitude to generate a low-threat level input that triggers another "warn-away" alarm so that the system continues to cycle "warn-away" alarms each induced by the preceding alarm.

Further, the invention herein contains the unique property of ignoring the first few milliseconds of signal produced by the sensor. A physical shock lasts far longer and the energy level of the residual signal is sufficient to pass through an integrator to a comparator to determine the relative strengths of the shocks. The signals produced by RF bursts, EMF bursts and the like do not last beyond that period because there is no physical movement imparted to the magnet; the energy bursts only interacted with the induction coil. Accordingly, those signals produced by non-physical excitement of the induction coil and that do not subside to its zero value before reappearing will not be allowed to proceed through the rest of the analyzing circuit and thus will not cause an alarm to be produced.

To overcome the problem of repeated sirens during periods of extended sensor input, such as in the train passing example, or even when a truck or other heavy vehicle passes a parked car, means are provided to prevent repeated alarms as long as the initial input remains within a given intensity for an extended time. For instance, as long as the intensity level of the input signal remains rather constant following cessation of the full alarm signal, the circuit will not process another sensor input. This means that the prolonged motion of the train or sensor input from a slow moving truck passing a car will not cause the alarm to sound again. This feature also prevents continuous alarm outputs in those cases when the input causes the input sensor to go into unabated oscillation. This input may be mechanical in nature (the train example) or from electrical disturbances.

In a second embodiment of this invention, the circuit is designed such that fewer wires need be used to attach the sensor to the alarm giving rise to a savings in material and reduction in installation time and training.

The prior art has recognized some of these problems, however, to date there has been little success achieved in solving them. In the patent to Hwang, (U.S. Pat. No. 5,084,967) a "motion detector" is allegedly connected to a pair of signal amplifier circuits that, upon receipt of a long signal or a series of short pulses from the detector, will sound a "full" alarm whereas, upon receipt of a shorter pulse signals, will sound a "pre-entry warning", lesser in severity than the "full" alarm. However, close examination of this patent discloses that the "detector" is merely a switch that is purely time-dependent so that the signal must be either of long duration or short duration to actuate the circuit. While in the block diagram shown in the patent there is a call for a "signal amplifier circuit", the schematic shows merely the use of components that are arranged as a switch to turn on and off a transistor to let the detected signal pass on to the alarm warning device. Thus, there is no comparison of the "level of intensity" of the signal but merely the "duration" of the signal notwithstanding its intensity. This is not an accurate assessment of a threat signal and does not detect between "intensities" nor between physical and non-physical inputs and therefore is lacking. In addition, the output signal from this prior art device goes directly to the signalling device (siren) whereas the instant invention interposes another device, the alarm control module, that determines what type of alarm is to be generated.

Accordingly, the main object of this invention is a method and apparatus for use on an electronically secured vehicle that responds differently to different intensities of shock received by the vehicle. Other objects of the invention include a method and apparatus that has at least two levels of intensity determination, one for a relatively light shock received by the vehicle to produce a pulse that may be used to trigger a warning of a stronger alarm should the shock not be discontinued and a separate pulse that may be used to trigger a stronger, louder alarm for non-discontinued light shocks and stronger shocks; a method and apparatus for producing a pulse that may be used to trigger a warn-away audible alarm that may be repeatedly sounded to signify the vehicle is under electronic security while not producing a pulse that may trigger the loudest alarm so as to minimize the disturbance to those nearby in the event of a non-threatening shock received by the vehicle; a method and apparatus that maintains readiness to produce a pulse that may be used to trigger an audible alarm even while a warn-away alarm message is being used; a method and apparatus for detecting a signal produced by a non-physical assault on the vehicle, such as by a burst of RF energy or EMF energy, and for removing it from further interaction in the system circuitry; a method and apparatus that provides full wave rectification of the induced signal in the induction coil to provide a more accurate analysis of the induced signal regardless whether the magnet initially moves away from the coil or toward it; an apparatus that may be retrofitted into existing vehicles as well as included as original equipment on new vehicles; and, an apparatus that will automatically rearm upon the completion of a measured length of the warn-away or the security-threatening alarm. These and other objects of the invention may be obtained by reading the following specification along with the drawings that are appended hereto. The protection sought by the inventor may be gleaned from a fair reading of the claims that conclude this specification.

DESCRIPTION OF THE PREFERRED EMBODIMENT

Figure 1:
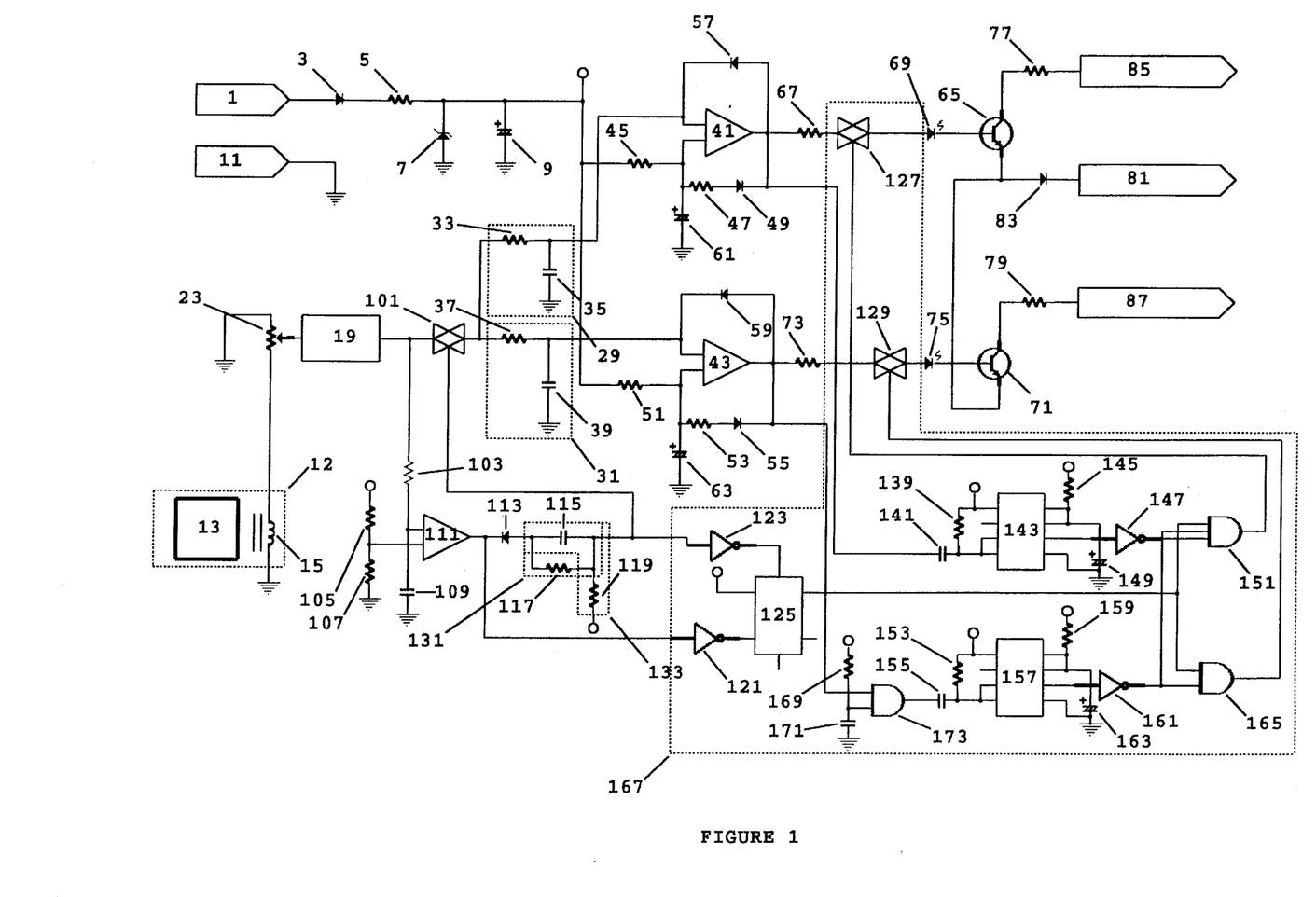
FIG. 1 is a schematic diagram of the apparatus using the method that provides the features of this invention.

The novel method of this invention for indicating the threat level of an incoming shock to an electronically secured structure, such as a vehicle comprises, the steps of sensing a shock delivered to the vehicle, generating an electric signal the strength of which is proportional to the intensity of the shock, ignoring the first portion of the signal so as to remove from further consideration those shocks that are non-physical, analyzing the remaining signal to determine if it is of a low, generally non-threatening intensity or a higher, generally security-threatening intensity, and producing either a first pulse that triggers a low intensity "warn away" alarm, or separate first and second pulses, representing a signal containing both the low intensity and higher intensity components, that trigger both a low and a high intensity alarms. The step of generating an electric signal includes generating an alternating current signal whose amplitude and length is proportional to the intensity of the physical shock. FIG. 1 shows the apparatus of this invention.

In FIG. 1 the solid lines between components refer to conductors and will not be individually numbered except where necessary. Where conductors cross and the intersection is marked with a dot or period, it is a junction; where one conductor crosses another and the intersection has no dot or period, there is no junction. As shown in FIG. 1, an input voltage, generally in the range of from about six to about eighteen volts (d.c.), is inputted from a battery (not shown), such as a car battery or other source of direct current, to an input terminal 1. The current is regulated by a reverse flow protection diode 3, a surge limiting resistor 5, an over-voltage protection Zener diode 7 and a filter capacitor 9 to produce a steady flow of direct current. The ground return enters at input terminal 11.

The step of sensing a mechanical shock delivered to the vehicle is performed by a sensor 12 comprising a permanent magnet 13, about which a continuous magnetic field exists, and is suspended in a conventional elastic mount (not shown), such as between a pair of rubber bands anchored to a pair of spaced-apart posts (not shown) that rest on a solid base, such as the security sensor housing (not shown). Magnet 13 will detect a incoming shock and begin to vibrate back and forth in the mount in proportion to the intensity of the shock. That is to say, for light or low intensity shocks, magnet 13 will vibrate only a small amount and the vibrations will soon attenuate, while for higher intensity shocks, the vibration will be greater and last longer.

Nearby is fixedly positioned an induction pickup coil 15. The step of generating an electric signal, the strength of which is proportional to the intensity of the shock, is performed by the variation of the magnetic field from the vibrations magnet 13 inducing an alternating current in a coil 15 that produces an alternating voltage or signal.

The step of analyzing the signal to determine if it is of a low or high intensity includes the first step of passing the signal through a switching capacitor amplifier 19 to provide full wave rectification, i.e., the negative portions of the signal are converted to positive portions. According, the output of amplifier 19 is always positive and will give an approximately equal output no matter the direction of the impact to the vehicle so as to iron out the difficulties herein before exhibited when the impact to the vehicle causes magnet 13 to initially move away from coil 15. The gain of amplifier 19 is fixed at a predetermined value. Potentiometer 23 is used to adjust the level of the input from sensor 12.

An analog bilateral switch 101 is provided. It is opened a few, i.e. 5 milliseconds of each pulse string, as will be hereinafter more fully set forth, in order to cut off the first portion of the signal output from amplifier 19. This cut off is to prevent extraneous, nonphysical energy surges, such as from EMF fields, as hereinbefore described, from tripping the alarm.

Shutting off switch 101 is accomplished by use of an inverting comparator 111 and its associated circuitry. Resistors 105 and 107 establish a reference voltage for comparator 111. Resistor 103 and capacitor 109 filter out high frequency transients on the input to comparator 111. As a signal inputted to comparator 111 goes high, the output goes low and is coupled through a diode 113 and a capacitor 115 to switch 101. By adjusting the capacitance of capacitor 115, a delay, such as 5 milliseconds is required to charge capacitor 115 in order to turn on bilateral switch 101. Resistor 117 is provided as the discharge resistor for capacitor 115 and its value is chosen so that capacitor 115 will not discharge for several hundred milliseconds so as not to interrupt the signal pulse string. The discharge time of capacitor 115 is such that only the first few milliseconds of any pulse string is allowed to be coupled through capacitor 115 and diode 113 to shut off analog bilateral switch 101.

The next step, after passing the amplified signal through switch 101 is to input this amplified signal simultaneously to two separate and independent voltage integrators, 29 and 31, shown within dotted line perimeters, that are paralleled from the output of amplifier 19. Integrator 29 comprises a resistor 33 and a capacitor 35 while integrator 31 comprises a resistor 37 and a capacitor 39. The ratio of sensitivity of integrators 29 and 31 is adjusted, by varying the resistance of resistors 33 and 37 and varying the capacitance of capacitors 35 and 39 to the order of approximately 5:1 so that integrator 29 is approximately five times as sensitive as integrator 31. This ratio can be varied outside of 5:1 under certain circumstances such as where the vehicle is unusually large.

The next step is to send the output of integrators 29 and 31 to a pair of separate voltage comparators/pulse generators 41 and 43 that are equally referenced from input terminal 1. The reference for voltage comparator 41 is established by resistors 45 and 47 and a diode 49 while the reference for voltage comparator 43 is established by resistors 51 and 53 and a diode 55. Another pair of diodes 57 and 59 are used to latch the respective voltage comparators 41 and 43 when their respective input signals exceed the comparator reference voltages.

The next step in this novel method is for the pulse generator portion of comparators/generators 41 and 43 to output either a first pulse from generator 41 representing a low intensity signal or separate first and second pulses from both generators 41 and 43 representing a signal containing a low intensity and a high intensity component. This is performed when voltage comparator 41 or 43 is latched through either diode 57 or diode 59 when the incoming signal from integrators 29 or 31 exceeds the reference voltage thereto. Once latched, the respective comparator produces an output pulse timed by resistor 45 and capacitor 61 with respect to comparator/pulse generator 41 or by resistor 51 and a capacitor 63 with respect to comparator/pulse generator 43 to one of two drive transistors 65 and 71.

Output drive transistor 65 receives the output pulse from voltage comparator/pulse generator 41 through a resistor 67 and an indicating light emitting diode 69 for the duration of the pulse from generator 41. The other output drive transistor 71 receives the output pulse from voltage comparator/pulse generator 43 through a resistor 73 and an indicating light emitting diode 75 for the duration of the pulse from generator 43. Resistors 77 and 79 are current limiting resistors to protect transistors 65 and 71 respectively. The outputs are enabled by a ground placed on terminal 81 through a diode 83. The outputs are fed respectively to terminal 85 to connect to a warn-away alarm circuit (not shown), and to terminal 87, to connect to the full alert alarm circuit (not shown). The output pulse for the warn-away alarm, from terminal 85, may be set at one length, such as 200 milliseconds, and the output pulse for the full alarm from terminal 87 may be set at a different length, such as approximately 1 full second.

The negative 5 millisecond pulse from comparator 111 is inverted by inverter 123. This pulse resets and holds in reset for the 5 millisecond period the "D flip-flop" 125. The "Q" output of 125 is connected to the inputs of "AND-GATES" gates 151 and 165, causes the outputs of 151 and 165 to go low. The low signals at the outputs of 151 and 165 opens normally closed analog bilateral switches 127 and 129. This prevents any output from pulse generators 41 and 43 from being coupled to output transistors 65 and 71.

After the end of the 5 millisecond reset pulse, the "Q" output at flip-flop 125 is set high by a clock signal created by comparator 111. This clock pulse is inverted by inverter 121 to present the proper input to the 125 clock input. The sensor outputs 85 and 87 are now enabled for the duration of the output pulse(s) created by pulse generators 41 and 43.

Output bypass timers 143 and 157 are triggered and reset from the trailing edge (negative going edge) of the output pulses from pulse generates 41 and 43 respectively. The output of full alarm pulse generator 43 is applied to timer 157 via AND-GATE 173. When any input of an And gate goes low, it's output goes low. All inputs of an AND-GATE must be high to get a high at it's output. These triggers are coupled to the inputs of the timers by coupling capacitors 141 and 155 respectively. Resistors 139 and 153 are pull-up resistors on the trigger input of their respective timers. Resistor 145 and capacitor 149 control the time that the "warn-away" output is disabled. Resistor 159 and capacitor 163 control the time that the "alarm" output is disabled. When the timers are triggered/reset, the timing capacitors 149 and 163 are discharged, the outputs go high, and the timing cycle is started. The outputs will go low at the end of the timing cycle.

The high output from warnaway bypass timer 143 is inverted by inverter 147 and applied to AND-GATE 151. The low at the input of 151 causes the output of 151 to go low opening bilateral switch 127. This interrupts any output from pulse generator 41 and disables the warnaway output drive to output transistor 65. All warnaway outputs are therefore disabled anytime that warnaway bypass timer 143 is running. All repetitive triggers that occur inside the timing window are bypassed (disabled) on the warnaway output until the warnaway bypass timer expires (approximately ½ second). While the timer is running, if the output at pulse generator 41 goes low (output pulse expires), the timing capacitor is discharged, and the timer is restarted with a full charging cycle duration to run.

Full alarm bypass timer 157, upon receiving a negative pulse from the trailing edge of the output pulse from pulse generator 43 via AND-GATE 173, works identical to the warnaway bypass timer 143. The high output from 157 is inverted by inverter 161 and applied to AND-GATES 151 and 165. The low at the inputs of 151 and 165 causes the outputs of 151 and 165 to go low. This low output in turn is applied to the control input of bilateral switches 127 and 129. Both output drives are interrupted, disabling both outputs (warnaway and full alarm) for the duration of the full alarm output bypass timer 157 (several seconds).

The full alarm bypass timer 157 is also used as a power up reset timer. At power on capacitor 171 is fully discharged, applying a low at the input of AND-GATE 173. Capacitor 171 is slowly charged through bias resistor 169 removing the low input from AND-GATE 173. The output of 173 is low during this charging period triggering full alarm bypass timer 157. Therefore, at power up, both outputs are disabled for several seconds until timer 157 times out.

Figure 2:
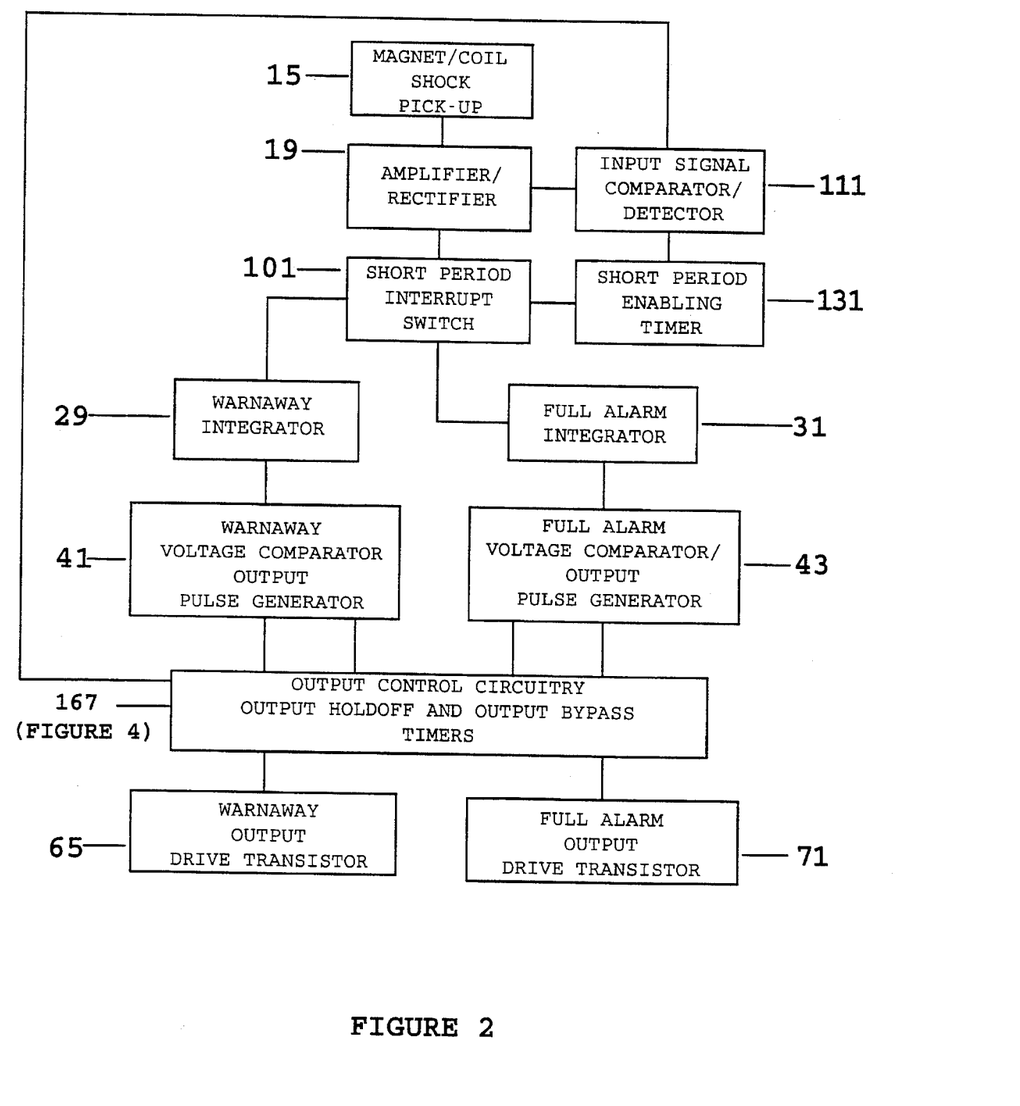
FIG. 2 is a flow diagram illustrating the operation of the apparatus generally depicted in FIG. 1.
Figure 4:
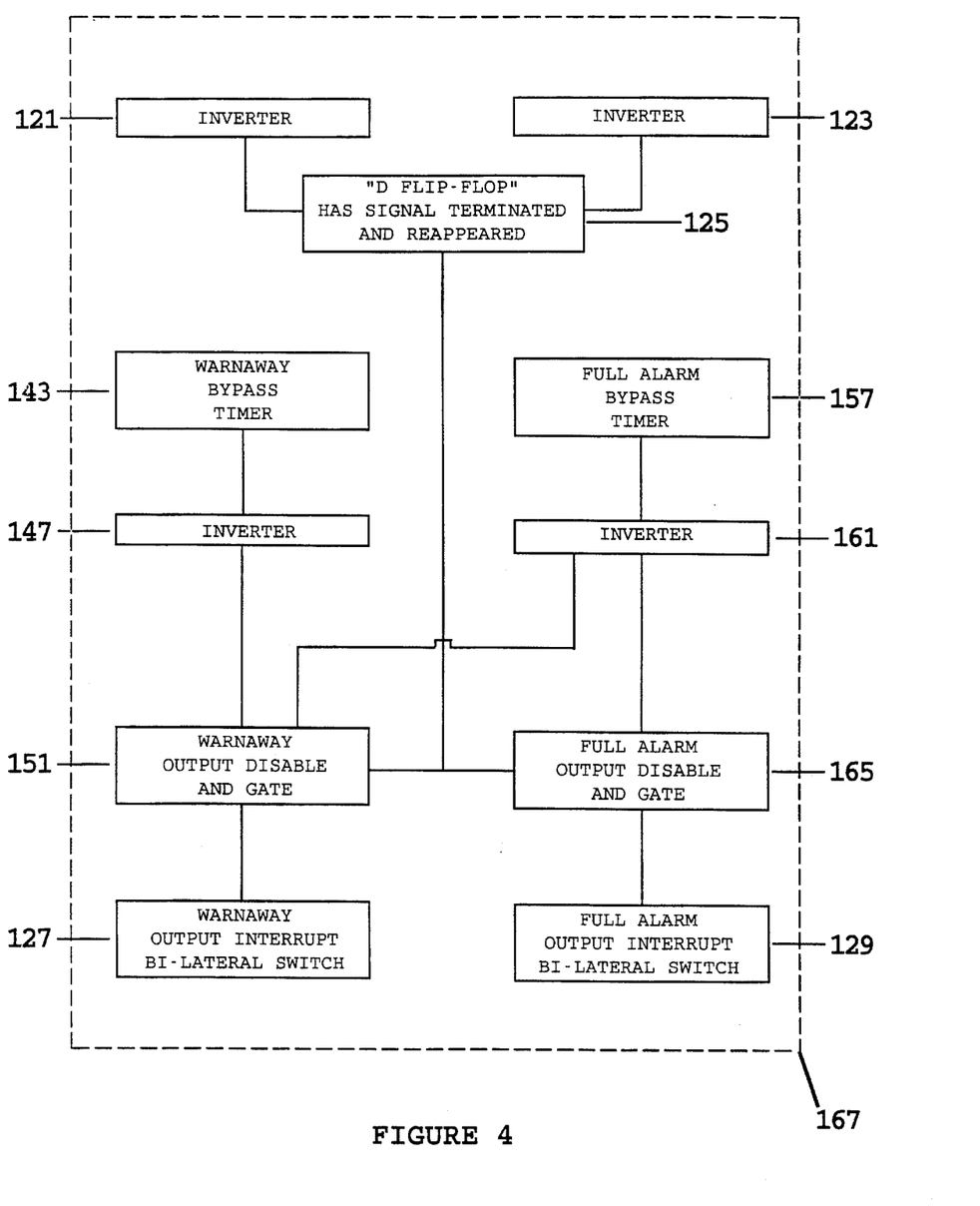
FIG. 4 is a flow diagram of a portion of that shown in FIG. 2.

FIG. 2 shows the flow of the induced signal and produced pulse through the circuit of FIG. 1. FIG. 4 is a flow diagram of a portion of FIG. 2. The magnet 13 and coil 15 components pick up the incoming shock and generate a signal the strength of which is proportional to the intensity of the shock. Amplifier 19 provides full wave rectification and amplification of the signal for presentment through switch 101 to integrators 29 and 31 in parallel for integration of the total value of the pulse train less the first part thereof cut off by switch 101. The respective sensitivities of integrators 29 and 31 help to differentiate between a light shock that in all probability is non-threatening in nature and a heavier shock that represents a potential intrusion into the vehicle. The separate voltage comparators/output pulse generators 41 and 43 complete the differentiation and output a pulse to the output indicator and driver that results in one or both alarms being activated.

Amplifier 19, referenced by voltage from the car battery, will amplify all shocks received by the vehicle. Integrators 29 and 31 will ignore any signal whose peak-to-peak voltage is equal to or less than the amplifier reference voltage. Hence, very light shocks, although felt by magnet 13 and coil 15, will not produce a signal or signals sufficient to be activated by voltage comparators/output pulse generators 41 and 43 to latch the respective unit and produce a pulse to be sent on to output drive transistors 65 and 71.

Upon receipt of a light shock, above the reference level of amplifier 19, the circuit will operate to activate voltage comparator 41, latch it, and produce a pulse that will activate the warn-away alarm trigger output (not shown) through terminal 85. While this is going on, the circuit remains fully prepared to receive and process other shocks. Should a heavy shock be received while the warn-away alarm is given, the security breached alarm trigger output, will be tripped through terminal 87 and both alarms output will be tripped to go off simultaneously. In all cases, both alarm trigger outputs are tripped go off when a severe shock is received while only the warn-away alarm trigger output is tripped when a lighter shock is received.

Figure 3:
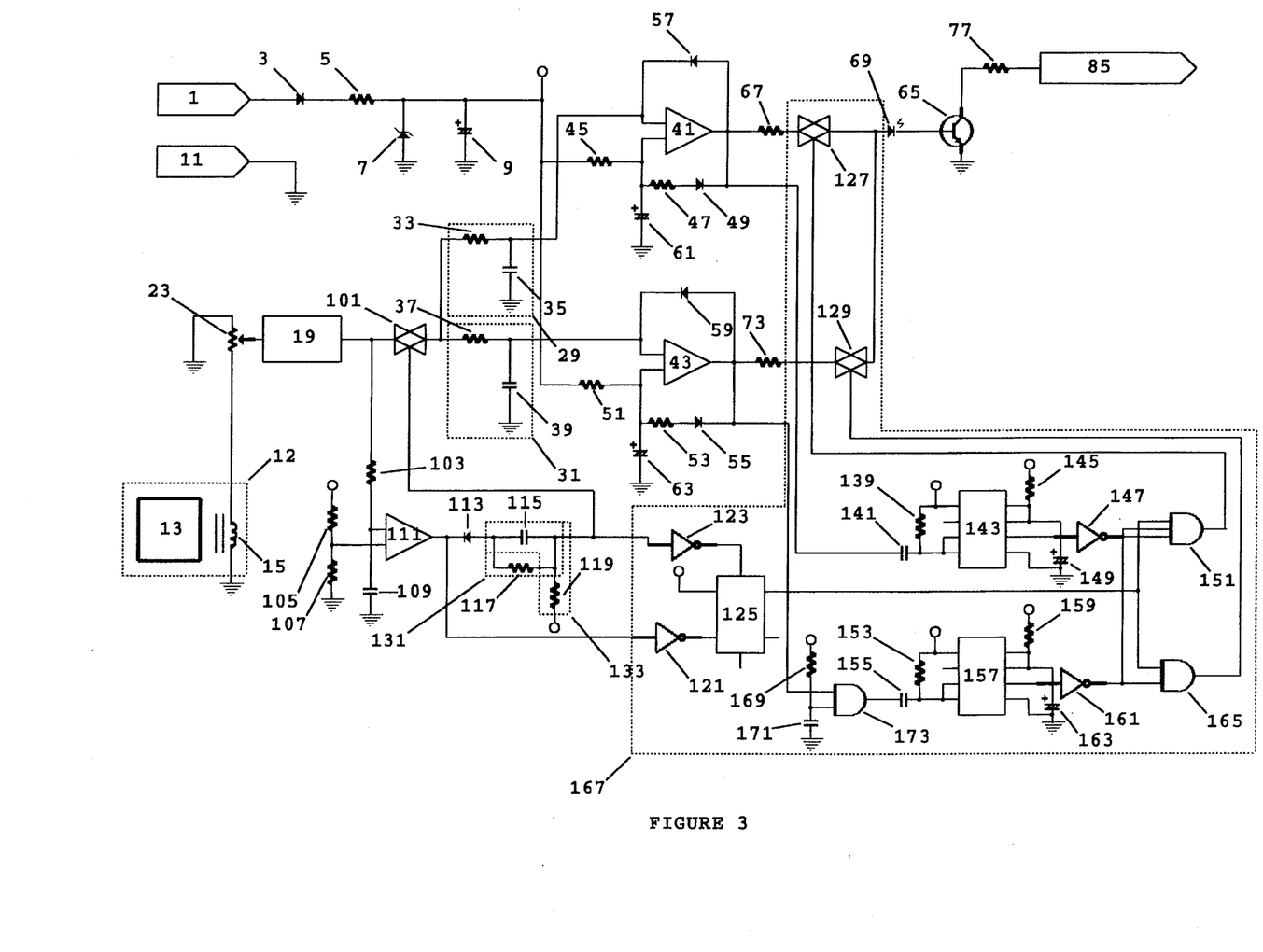
FIG. 3 is a schematic diagram of an alternate embodiment of the apparatus showing less wiring needed to accomplish the same functions as shown in FIG. 1.

FIG. 3 shows an alternate embodiment of the invention. By changing the timing of the full alarm pulse generator, to say 5 times the normal 200 milliseconds, allows for a considerable reduction in the output circuitry. This would also reduce the installation time of the sensor. With a 200 millisecond warnaway output pulse and one second full alarm pulse, these pulses can be outputted on the same wire for applying to one such input of the alarm control module.

To achieve a longer duty cycle for a full intensity alarm, full; alarm output pulse generator 43/timing capacitor 63 is changed to 5 times it's normal value. The full alarm output pulse time is therefore increased by a factor of 5.

The outputs from output pulse generators 41 and 43 are then applied to the common output indicating LED 69 and output drive transistor 65. This is accomplished via output drive current limiting resistors 67 and 73 and analog bilateral switches 127 and 129 connecting to a common conductor before reaching LED 69. Therefore the LED will indicate warnaway output with a short 200 millisecond light output pulse and full alarm output with a longer one second light output pulse. The output transistor 65 will be conducting applying a ground or near ground potential to the collector for 200 milliseconds for warnaway and for one second for full alarm.

This invention also carries the capability to drive the vehicle's electronic security system's audible or visual warning devices directly or indirectly by use of an external control relay. Since the warn-away output pulses are short (approximately 2/10 of a second) and could be enabled by the vehicle's electronic security system, this would greatly reduce the annoyance created by an alarm system's full alarm. The output drivers have the capability to drive output control circuits as long as a ground is applied to output control terminal 81. These output pulses would be fed through output terminals 85 and 87 to directly or indirectly drive warning devices.

Although this invention is written in respect to a shock sensor, it is not limited to the same. The input to the protected vehicle could be sensed by any of the following detectors: shock, motion, shock/motion, audio discriminator, field disturbance, or other detector(s) with the proper input circuitry.

Figure 5:
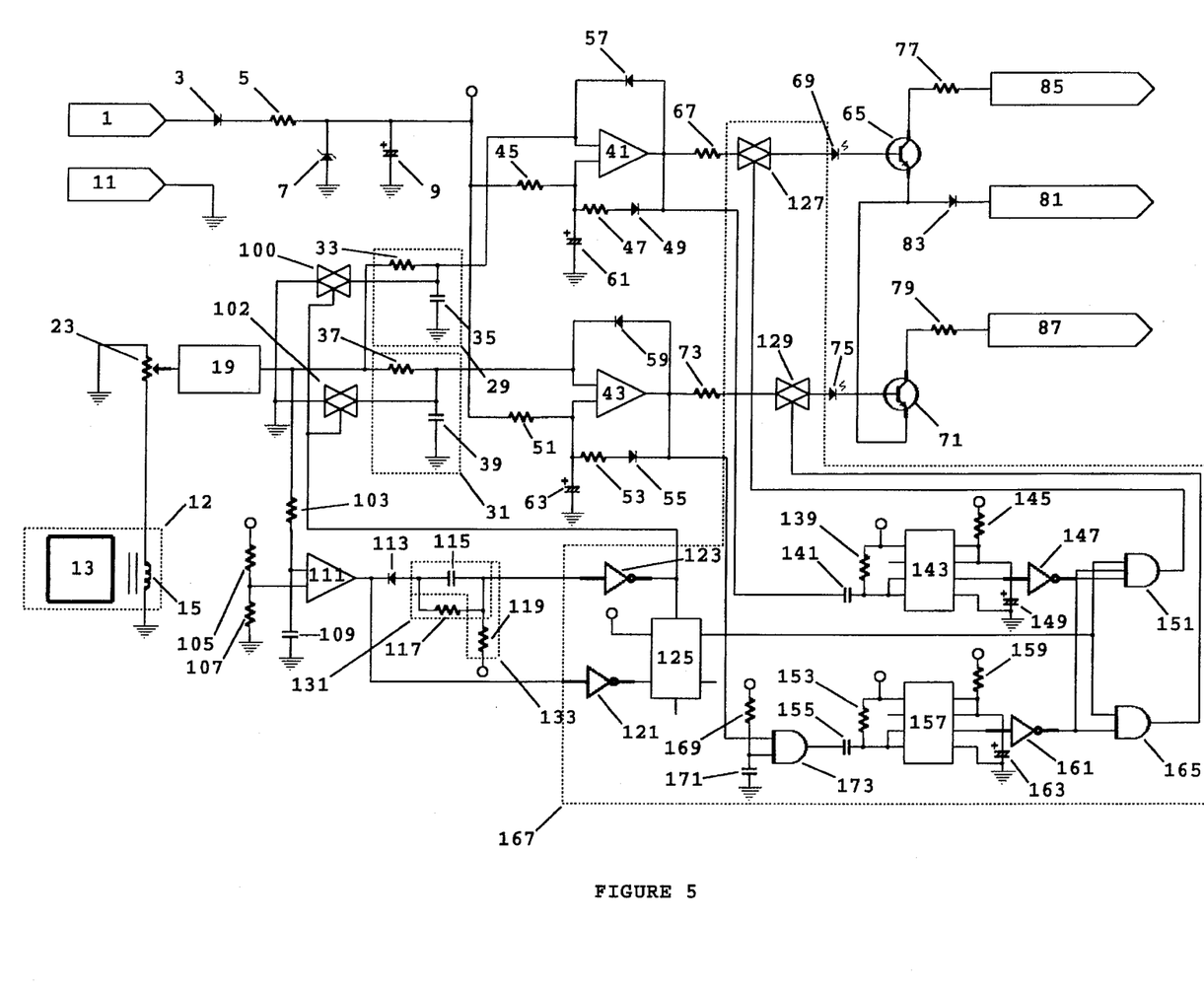
FIG. 5 is a schematic diagram of an alternate embodiment of the bilateral switch wiring shown in FIG. 1; and, FIG. 6 is a schematic diagram of an alternate embodiment of the bilateral switch wiring shown in FIG. 3.

FIG. 5 represents a modification to the preferred embodiment shown in FIG. 1 and shows the output of the 5 millisecond timer 131 to invert the signal, by inverter 123, and feeding the output signal to two normally open, bilateral switches 100 and 102. The signal closes switches 100 and 102 for the 5 millisecond period. This also keeps integrator capacitors 35 and 39 shorted out for the 5 millisecond time period. This represents another method of handling the signal.

Figure 6:
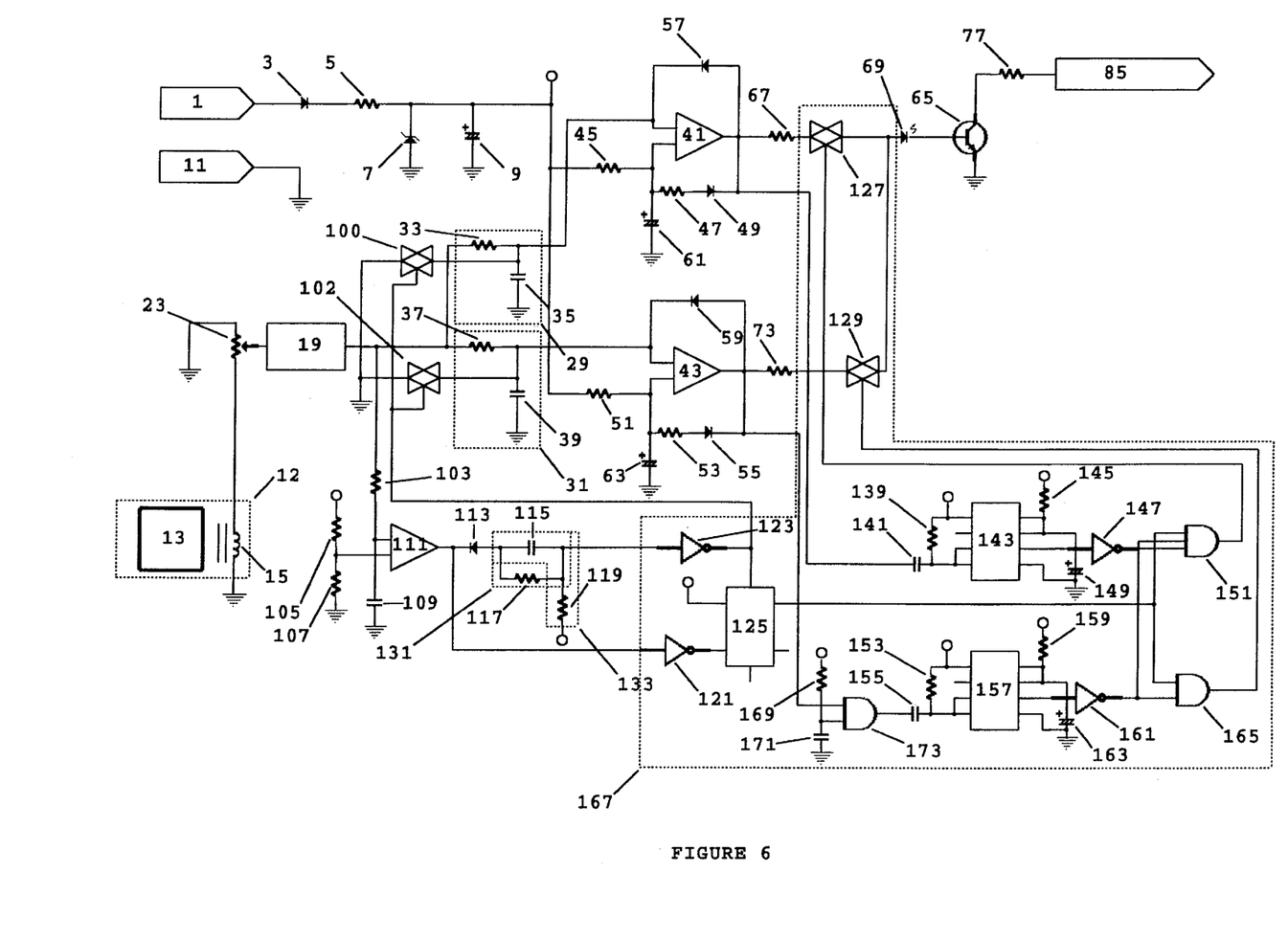

FIG. 6 represents a modification to the other preferred embodiment shown in FIG. 3 and also shows the output of the 5 millisecond timer 131 to invert the signal, by inverter 123, and feeding the output signal to two normally open, bilateral switches 100 and 102. The signal closes switches 100 and 102 for the 5 millisecond period. This also keeps integrator capacitors 35 and 39 shorted out for the 5 millisecond time period. This represents another method of handling the signal.

Also this unit is described as a 2-stage sensor, but the invention is not limited to 2 stages and may be employed with three (3) or more stages. The output pulses may vary in lengths such as 200 milliseconds for the "warnaway" and approximately one full second for the full alarm output. This will allow alarms with the capability to distinguish between "warnaway" and full alarm using one input. This will eliminate one drive transistor and one wire.

While the invention has been described by reference to a particular embodiment thereof, those skilled in the art will be able to make various modifications to the described embodiment of the invention without departing from the true spirit and scope thereof. It is intended that all combinations of elements and steps which perform substantially the same function in substantially the same way to achieve the same results are within the scope of this invention.

What is claimed is:

1. A method of indicating a threat level of an incoming shock to an electronically secured vehicle comprising the steps of:

a) sensing a shock delivered to the vehicle;

b) generating a signal having strength proportional to the intensity of said shock;

c) analyzing said signal to determine if it has a low, generally non-threatening intensity or a higher, generally security-threatening intensity; and d) producing either a first pulse, representing that said signal has only said low intensity, or separately producing said first pulse and a second pulse, representing that said signal has both said low intensity and said higher intensity.

2. The method of claim 1 wherein the step of generating said signal includes the step of generating an alternating current signal having an amplitude proportional to said intensity of said shock.

3. The method of claim 1 wherein the step of analyzing said signal includes the steps of:

a) amplifying said signal to produce an amplified signal;

b) impressing said amplified signal simultaneously to at least two separate integrators of different sensitivity to produce integrated signals; and c) activating a pulse generator specific to each of said integrated signals, if the associated integrated signal reaches a predetermined level.

4. The method of claim 1 wherein the step of analyzing said shock signal includes the steps of:
   a) amplifying said signal to produce an amplified signal;
   b) impressing said amplified signal simultaneously to at least two separate integrators of different sensitivity to produce integrated signals;
   c) impressing said integrated signals simultaneously to at least two separate comparators of different sensitivity to produce a first comparator signal, if said integrated signals reach a first predetermined level, indicating said non-threatening intensity signal or a second comparator signal, if said integrated signals reach a second, higher predetermined level, indicating said higher threatening intensity signal; and
   d) activating a pulse generator specific to said first and said second comparator signals.

5. The method of claim 1 wherein the step of analyzing said shock signal includes the steps of:
   a) amplifying said signal to produce an amplified signal;
   b) impressing said amplified signal simultaneously to at least two separate integrators/comparators, each said integrator/comparator having different sensitivity; and
   c) activating a pulse generator to produce said first and said second pulses specific to each signal integrated and compared if that signal reaches an associated predetermined level.

6. The method of claim 1 wherein said step of analyzing said signal includes the steps of:
   a) amplifying said signal to produce an amplified signal;
   b) impressing said amplified signal simultaneously to at least two separate integrators of different sensitivity, to produce integrated amplified signals;
   c) impressing said separate integrated, amplified signals to at least two signal comparators, one in series with each said integrator having different sensitivity to provide a first comparator signal indicating said non-threatening intensity signal or a second comparator signal indicating said higher threatening intensity signal; and
   d) activating a pulse generator specific to each said comparator signal if said integrated, amplified signal reaches an associated predetermined level.

7. The method of claim 1 including the additional step of ignoring the first few milliseconds of said signal produced by a shock sensing device to eliminate spurious, nonphysical signals produced by random EMF energy fields interacting with said shock sensing device.

8. The method of claim 1 wherein the step of providing either said first pulse or said second pulse includes sending said pulses over a single conductor to an alarm control.

9. The method of claim 1 including the additional step of ignoring any signal produced by nonphysical energy.

10. The method of claim 9 wherein said nonphysical energy includes an EMF field.

11. The method of claim 1 wherein the step of analyzing said signal includes the additional steps of amplifying and rectifying the full wave of said signal so that said output represents all values of said signal, is solely positive, and reduces the differential in the positive and negative aspects of said signal that are produced when a magnet swings away from an inductor coil before swinging toward said coil.

12. The method of claim 1 wherein said second pulse has a pulse-width greater than a pulse-width of said first pulse.

13. An electronic vehicle security system for indicating a threat level of an incoming shock to an electronically secured vehicle comprising:
   a) means for sensing a shock delivered to the vehicle;
   b) means for generating a signal having strength proportional to the intensity of said shock;
   c) means for analyzing said signal to determine if it has a low, generally non-threatening intensity or a higher, generally security-threatening intensity; and
   d) means for providing either a first pulse representing that said signal has only said low intensity or separately providing said first and a second pulse, representing that said signal has both said low intensity and said higher intensity signal.

14. The electronic vehicle security system of claim 13 further including means for ignoring the first few milliseconds of said signal produced by said shock sensor to eliminate spurious, nonphysical signals produced by random EMF energy fields interacting with a shock sensing device.

15. The electronic vehicle security system of claim 13 further including means for sending said first and second pulses over a single conductor to an alarm control.

16. The system of claim 13 wherein said means for sensing a shock delivered to said vehicle includes a permanent magnet, having a magnetic field thereabout, suspended in an elastic mount on said vehicle for vibrating in said mount in response to said shock.

17. The system of claim 16 further including an induction coil fixedly mounted near said magnet for receiving a vibrating magnetic field therein to produce an induced alternating current and voltage therein.

18. The system of claim 17 further including a capacitor through which said induced alternating current and said voltage are passed to remove direct current and voltage therefrom.

19. The system of claim 17 wherein said means for analyzing said signal includes:
   a) a signal amplifier, having an output therein, for receiving said induced alternating current and voltage from said induction coil and providing an amplified signal thereof; and
   b) first and second voltage integrators connected to said amplifier output, said first integrator having a high sensitivity for responding to said non-threatening intensity signal and said second integrator having a lower sensitivity for responding to said higher intensity signal, said integrators simultaneously receiving said amplified signal from said amplifier.

20. The system of claim 19 wherein said means for providing either said first pulse or said separate first and second pulses include a pair of voltage comparators/output-pulse-generators, one connected to each said voltage integrator for comparing integrated voltages produced from each said integrator and providing said first pulse representing said low intensity signal from said high sensitivity integrator and providing both said first and said separate second pulse representing said low intensity signal from said high sensitivity integrator and said high intensity signal from said low sensitivity integrator.

21. The system of claim 17 wherein said means for analyzing said signal includes:
   a) a signal amplifier, having an output therein, for receiving said induced alternating current and voltage from said induction coil and providing an amplified signal thereof; and
   b) first and second voltage comparators connected to said amplifier output, said first comparator having a high sensitivity for responding to said non-threatening intensity signal and said second comparator having a lower sensitivity for responding to said higher intensity signal, said integrators simultaneously receiving said amplified signal.

22. The system of claim 17 wherein said means for analyzing said signal includes:
   a) a signal amplifier, having an output therein, for receiving said induced alternating current and voltage from said induction coil and providing an amplified signal thereof; and
   b) first and second voltage integrators and comparators connected to said amplifier output, said first integrator and comparator having a high sensitivity for responding to said non-threatening intensity signal and said second integrator and comparator having a lower sensitivity for responding to said higher intensity signal, said integrators and comparators simultaneously receiving said amplified signal from said amplifier.

23. The electronic vehicle security system of claim 13 further including means for ignoring any signal produced by nonphysical energy.

24. The electronic vehicle security system for indicating the threat level of an incoming shock to an electronically secured vehicle of claim 23 wherein said nonphysical energy includes an E F field.

25. The electronic vehicle security system of claim 13 wherein said second pulse has a pulse-width greater than a pulse-width of said first pulse.

26. A method of blocking spurious signals produced by a shock sensor in a motor vehicle anti-theft system from interaction between extraneous bursts of RF energy and a sensor induction coil, comprising the steps of:
   a) amplifying a signal produced by a shock sensor to produce an amplified signal;
   b) inputting said amplified signal to a comparator and comparing an output signal of said invertor/comparator against a known reference; and
   c) outputting said amplified signal to an analog bilateral switch through a capacitor so that the charging of said capacitor will open said switch a few milliseconds to delete the front end of said amplified signal and remove it from further consideration.

27. The method of claim 26 wherein the step of amplifying said signal includes the additional steps of amplifying and rectifying a full wave of said signal so that said amplified signal represents all values of said signal, is solely positive, and reduces the differential of the positive and negative aspects of said signal that are produced when a magnet swings away from an inductor coil before swinging toward said coil.

28. A method of indicating the threat level of an incoming shock to an electronically secured vehicle including a magnet and an induction coil arranged as part of a shock sensor comprising the steps of:
   a) sensing a shock delivered to the vehicle including the step of generating an alternating current signal having amplitude proportional to the intensity of said shock;
   b) analyzing said signal to determine if it is of a low, generally non-threatening intensity or a higher, generally security-threatening intensity, including the steps of:
      i) rectifying and amplifying said signal;
      ii) impressing said rectified, amplified signal simultaneously to at least two separate integrators of different sensitivity;
      iii) impressing said separate integrated, amplified signals to at least two signal comparators of different sensitivity, one in series with each said integrator; and
      iv) activating a pulse generator responsive to an output of each signal comparator; and
   c) providing either a first pulse representing a low intensity signal, or separate first and second pulses representing said signal containing both low intensity and higher intensity components.

29. The method of claim 28 including the additional step of ignoring the first few milliseconds of said signal to eliminate spurious signals produced by random EMF energy fields interacting with said shock sensor.

30. The method of claim 28 wherein the step of providing either said first pulse or said second pulse includes sending said pulses over a single conductor to an alarm control.

31. The method of claim 28 including the additional step of ignoring nonphysical signals interacting with the shock sensing device.

32. The method of claim 31 wherein said nonphysical signals include EMF energy fields.

33. The method of claim 28 wherein said second pulse has a pulse-width greater than a pulse-width of said first pulse.

34. An electronic vehicle sensor for indicating the threat level of an incoming shock to an electronically secured vehicle comprising:
   a) means for sensing a shock delivered to a vehicle including a permanent magnet, having a magnetic field thereabout, suspended in an elastic mount on said vehicle for vibrating in said mount in response to said shock;
   b) means for generating a signal the strength of which is proportional to the intensity of said shock including an induction coil fixedly mounted near said magnet for receiving a vibrating magnetic field therein to produce an induced alternating current and voltage therein;
   c) a capacitor through which said induced alternating current and voltage are passed to remove direct current and voltage therefrom;
   d) means for analyzing said signal to determine if it is a low, generally non-threatening intensity or a higher, generally security-threatening intensity including:
      i) a signal amplifier for receiving said induced alternating current and voltage from said induction coil; and
      ii) a pair of voltage integrators connected to an output of said amplifier which produces an amplified signal, one said integrator having a high sensitivity for responding to said amplified signal containing only low intensity components and the other said integrator having a lower sensitivity for responding to said amplified signal containing higher intensity components, said integrators simultaneously receiving said amplified signal from said amplifier; and
   e) means for producing either separate first and second pulses representing said signal containing both said low intensity and said higher intensity component, or said first pulse representing said low intensity signal, including a pair of voltage comparators/output pulse generators, one connected to each said voltage integrator for comparing outputs produced from each said integrator and producing said first pulse representing said low intensity signal from said high sensitivity integrator and providing both said first and said separate second pulse from both said generators representing said low intensity signal from said high sensitivity integrator and a high intensity signal from said low sensitivity integrator.

35. The method of claim 34 wherein said second pulse has a pulse-width greater than a pulse-width of said first pulse.

36. A method of blocking spurious signals produced in a motor vehicle anti-theft system from interaction between extraneous bursts of EMF or RF energy and a sensor induction coil, comprising the steps of:

a) amplifying signals produced by a shock sensor including amplifying a full wave of said signal providing an amplified signal and rectifying said amplified signal so that said amplified signal represents all values of said signal, is solely positive, and reduces the differential in the positive and negative aspects of said signal that are produced when a magnet swings away from an inductor coil before swinging toward said coil;

b) outputting said amplified signal to an analog bilateral switch through a capacitor so that charging said capacitor will open said switch for a predetermined period of time to delete a front end of said amplified signal as it passes therethrough and remove said front end from further consideration; and c) inputting said amplified signal to a comparator and comparing it against a known value.

37. The method of claim 36 wherein said predetermined period of time is about 5 milliseconds.

38. A method of blocking spurious signals produced by a shock sensor in a motor vehicle anti-theft system from interaction between extraneous bursts of RF energy and a sensor induction coil, comprising the steps of:

a) amplifying signals produced by a shock sensor to produce an amplified signal;

b) inputting said amplified signal to a comparator and comparing it against a known reference;

(c) ignoring said signal produced by said shock sensor for a predetermined period of time to eliminate spurious, nonphysical signals produced by random energy interacting with a shock sensing device and removing it from further consideration 39. The method of claim 38 wherein the step of ignoring said signal includes outputting said signal to an analog bilateral switch through a capacitor so that the charging of said capacitor will open said switch a few milliseconds to delete the front end of said signal and remove it from further consideration.

40. The method of blocking spurious signals produced by a shock sensor in a motor vehicle anti-theft system of claim 38 wherein said nonphysical signal includes an EMF field.

* * * * *